United States Patent
Maass et al.

(10) Patent No.: US 7,382,236 B2
(45) Date of Patent: Jun. 3, 2008

(54) METHOD AND DEVICE FOR DRIVER INFORMATION AND TO REACT TO LEAVING THE LANE

(75) Inventors: Alexander Maass, Leonberg (DE); Joerg Heckel, Rutesheim (DE)

(73) Assignee: Robert Bosch GmbH, Stuttgart (DE)

( * ) Notice: Subject to any disclaimer, the term of this patent is extended or adjusted under 35 U.S.C. 154(b) by 17 days.

(21) Appl. No.: 10/517,744

(22) PCT Filed: May 26, 2003

(86) PCT No.: PCT/DE03/01685

§ 371 (c)(1),
(2), (4) Date: Jul. 6, 2005

(87) PCT Pub. No.: WO03/105108

PCT Pub. Date: Dec. 18, 2003

(65) Prior Publication Data

US 2006/0152346 A1    Jul. 13, 2006

(30) Foreign Application Priority Data

Jun. 11, 2002 (DE) .............................. 102 25 952
Aug. 21, 2002 (DE) .............................. 102 38 215

(51) Int. Cl.
*B60Q 1/00* (2006.01)

(52) U.S. Cl. ........................... 340/436; 340/937

(58) Field of Classification Search ............... 340/436, 340/435, 437, 937; 180/280, 274
See application file for complete search history.

(56) References Cited

U.S. PATENT DOCUMENTS

| | | | |
|---|---|---|---|
| 4,348,652 A | | 9/1982 | Barnes et al. |
| 5,225,827 A | | 7/1993 | Persson |
| 5,521,579 A | | 5/1996 | Bernhard |
| 5,673,019 A | * | 9/1997 | Dantoni ...................... 340/475 |
| 5,835,028 A | * | 11/1998 | Bender et al. .............. 340/436 |
| 5,982,278 A | | 11/1999 | Cuvelier |
| 6,038,496 A | * | 3/2000 | Dobler et al. ............... 340/436 |
| 6,489,887 B2 | * | 12/2002 | Satoh et al. ................ 340/436 |
| 6,502,035 B2 | * | 12/2002 | Levine ....................... 340/465 |
| 6,748,302 B2 | * | 6/2004 | Kawazoe .................... 340/937 |
| 6,894,606 B2 | * | 5/2005 | Forbes et al. ............... 340/436 |
| 7,038,577 B2 | * | 5/2006 | Pawlicki et al. ............ 340/436 |
| 7,091,838 B2 | * | 8/2006 | Shimakage ................. 340/436 |

FOREIGN PATENT DOCUMENTS

| | | |
|---|---|---|
| DE | 196 37 053 | 4/1998 |
| EP | 1 074 430 | 2/2001 |
| WO | 00 54008 | 9/2000 |

* cited by examiner

*Primary Examiner*—John A Tweel, Jr.
(74) *Attorney, Agent, or Firm*—Kenyon & Kenyon LLP

(57) ABSTRACT

A method and a device are proposed for driver information and for a reaction upon the leaving of the traffic lane by the vehicle. The driver warning and the driver intervention are a function, in this context, of the driving situation, especially of the type of an edge marking of the traffic lane.

9 Claims, 3 Drawing Sheets

METHOD AND DEVICE FOR DRIVER INFORMATION AND TO REACT TO LEAVING THE LANE

CROSS-REFERENCE TO RELATED APPLICATIONS

The present application is a national-phase application under 35 U.S.C. § 371 based on PCT application PCT/DE03/01685 filed on May 26, 2003, and the present application claims priority based on German Patent Application Number 102 25 952.6, filed on Jun. 11, 2002, and German Patent Application Number 102 38 215.8, filed on Aug. 21, 2002.

FIELD OF THE INVENTION

The present invention relates to a method and a device for driver information and a reaction upon departure from the traffic lane, or, more accurately, in response to the leaving of the lane that is to be expected.

BACKGROUND INFORMATION

Warning systems, which warn the driver when he leaves the lane, or rather, threatens to leave the lane, are known in the related art. European Published Patent Application No. 1074430, for example, shows a procedure in which, based on image sensor systems, the lane in which the vehicle is moving is ascertained, and the driver is warned when the vehicle leaves the lane or threatens to do so. Information on the exact boundary conditions, under which such a warning is given, is not stated. In particular, the respective driving situation is not taken into consideration, so that disagreeable false warnings to the driver may occur.

From German Published Patent Application No. 196 37 053 it is known that one may detect objects on a neighboring traffic lane, with the aid of an angle-resolving distance and speed sensor, preferably a radar or laser sensor, and ascertain their travel direction in the light of the relative speed of these objects.

SUMMARY OF THE INVENTION

By taking into consideration the driving situation for triggering the warning and/or the vehicle intervention (reaction) upon leaving the traffic lane, false warnings or false reactions are effectively avoided. Warnings of the driver or reactions for avoiding leaving the traffic lane therefore take place only in response to a relatively certainly recognized danger situation. Thus by using the measure described, the utility and the acceptance of a corresponding system are greatly enhanced.

In an advantageous manner, the driving situation on the neighboring traffic lane is recognized in the light of the kind of traffic lane markings and/or the type of traffic in whose direction the leaving of the lane is to be expected. In one concrete application, when a broken line is recognized as a traffic lane marking, no warning is undertaken, or a more inconspicuous warning and no vehicle intervention. In another application, a neighboring lane for traffic in the same travel direction is regarded as a travel situation in which a warning and a reaction upon leaving the traffic lane may be undesired, and consequently suppression of the warning and the reaction takes place, or an inconspicuous warning is generated. By contrast to this, upon recognition of an unbroken line, or, in response to a neighboring lane for traffic in the opposite direction, a dangerous situation having a high probability should be present in response to leaving, or threatening to leave the traffic lane, so that, in such a situation, a warning and/or a reaction is meaningful. If the vehicle crosses a line in the direction of a lane which is known, e.g. from the information of a navigation system as a breakdown lane, the warning may be delayed or undertaken using less intensity.

Also advantageous is a combination of the criteria of the kind of traffic lane marking and the type of traffic situation in the neighboring lane. In that case, given a broken line and a neighboring traffic lane for traffic in the driving direction, the warning or the reaction is suppressed, or an inconspicuous warning is generated, whereas in the case of a broken line and a neighboring lane for traffic in the opposite direction, as well as in the case of unbroken markings, a warning and a reaction take place.

In an especially advantageous manner, the data that lead to the derivation of the traffic situations are ascertained from image sensor signals, and perhaps in supplementary fashion from distance sensor signals or from data of a navigation system. The expenditure for implementing the procedure described is decreased by using sensors and data that are present anyway.

In an advantageous manner, by using sensor systems that ascertain data forwards, backwards and/or sideways with respect to objects present, the accuracy of the warning and the reaction may be further enhanced. In this case, a warning and a reaction take place if the traffic lane is left or leaving the lane is threatened and, possibly in response to detected broken marking lines, there are indeed objects on the neighboring lane in the surroundings of the vehicle, which are particularly moving in the same travel direction.

Additional advantages result from the following description of exemplary embodiments and from the dependent claims.

DETAILED DESCRIPTION

Figure 1:
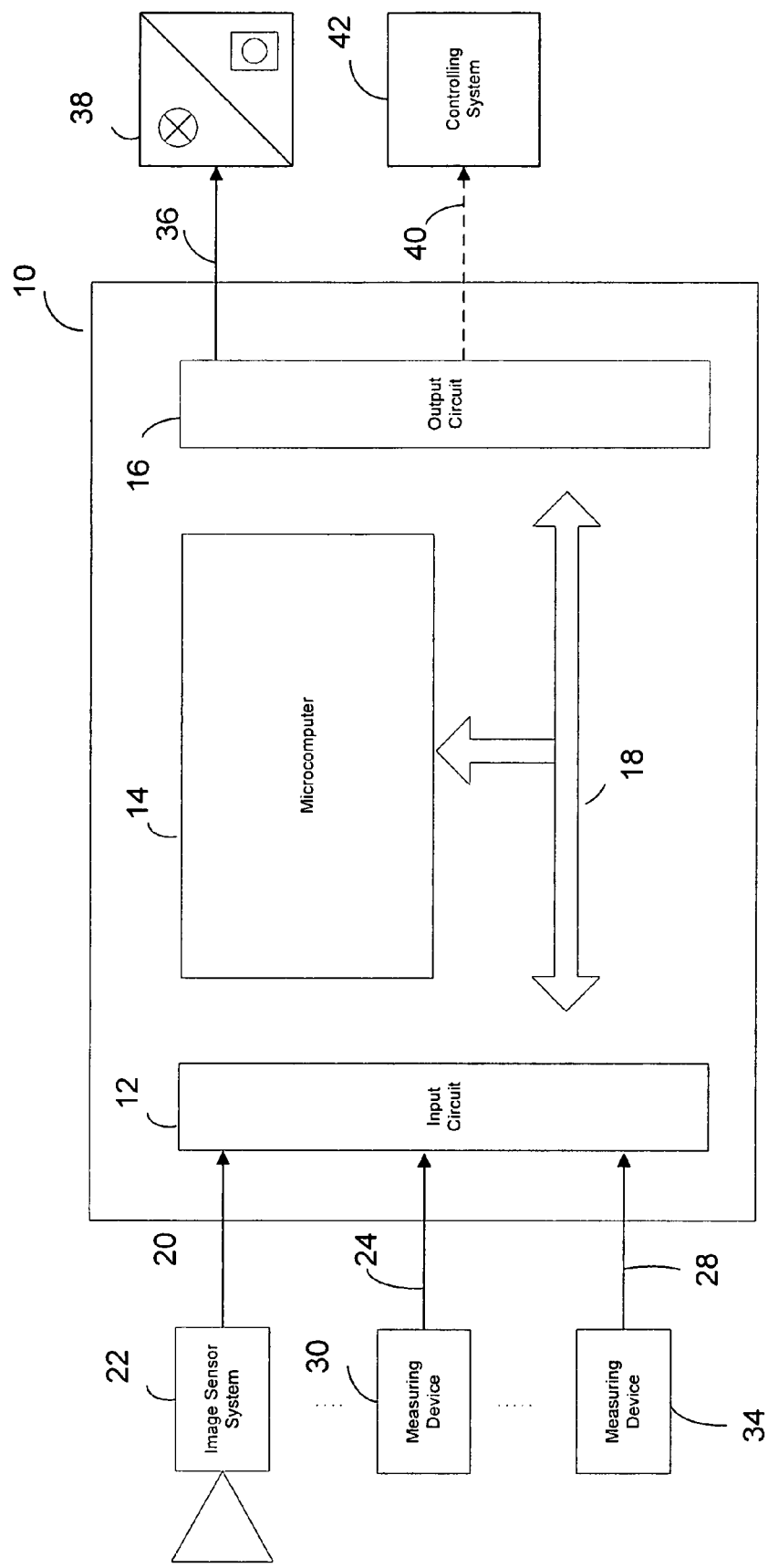
FIG. 1 shows, in this context, a block diagram of a device for warning a driver and for a reaction when the vehicle threatens to leave the lane.

FIG. 1 shows a device used for warning the driver and for a reaction in response to future leaving of the lane of the vehicle. What is shown is a control or evaluation unit 10, which has an input circuit 12, a microcomputer 14 and an output circuit 16. These elements are interconnected via a bus system for mutual data exchange. Input lines from various measuring devices, via which measuring signals and measuring data are transmitted, are supplied to input circuit 12. A first input line 20 connects input circuit 12 to an image sensor system 22, which picks up the scene in front of the vehicle. Corresponding image data are transmitted via input line 20. Furthermore, input lines 24 to 28 are provided which connect input circuit 12 to measuring devices 30 to 34. These measuring devices are, for example, measuring devices for measuring the vehicle speed, for recording the steering angle and for recording additional operating variables of the vehicle, which have meaning in connection with the procedure described below. At least one warning device 38 is activated via output circuit 16 and output line 36, for instance, a warning lamp and/or a loudspeaker for an acoustical warning or a voice response and/or a display for displaying an image, with the aid of which the driver is informed and/or warned before the departure, that is to be feared, from the lane, according to the procedure shown below. In addition, or alternatively, it is provided in some exemplary embodiments that one should activate a controlling system 42 via output circuit 16 and an output line 40, which automatically leads back into the lane, for instance by an intervention in the steering of the vehicle, and thus prevents leaving the lane.

In the preferred exemplary embodiment, the recognition of the lane markings is made by an image sensor system, preferably a camera system. By analysis of the pictures taken, especially in the light of the gray-scale value distribution, an image evaluation unit recognizes edge markings whose pattern is ascertained as a mathematical function and a differentiation is made as to whether the lines are broken or solid. The image sensor system is also used in one embodiment to observe objects in the surroundings of the traffic lane of the vehicle, and consequently also in neighboring lanes (left or right). In this context, same as above, customary object recognition methods are used. In the light of successive exposures and the speed of one's own vehicle, based on these data, one may ascertain whether a detected object in a neighboring lane is traveling in the same direction or in the opposite direction. In this way one may record the travel situation (type of marking and or kind of neighboring lane and/or traffic situation). Instead of the image sensor system, in other embodiments other sensors are used to record the driving situation, such as radar sensors, laser sensors, etc. Furthermore, in other embodiments sensors are present which detect objects all the way around the vehicle and which ascertain the distances from these objects. In these cases, one may not only ascertain the travel direction in a neighboring lane, but rather the actual presence of vehicles and their direction of movement in the neighboring lane.

Based on the data concerning at least one travel lane edge marking, whose pattern is shown as a mathematical equation, as well as the future trajectory of one's own vehicle ascertained, for example, based on the steering angle, etc, in response to intersection or inadmissible close approach of these two functions, it is determined that leaving the lane is to be expected. If this is the case, and if there is a travel situation in which one may assume a heightened potential of danger, a warning is emitted to the driver, acoustically and/or optically and/or haptically, or by a purposeful intervention in the course of the vehicle, such as by a steering intervention, a correction of the course is undertaken. In this context, the warning is clear, such as loud tones, fading in a large, possibly colored warning notice, etc.

If a solid line is recognized as an edge marking, such as a solid center line or edge line, if there is a threat of crossing these edge lines, a warning and a reaction are undertaken. In the case of broken lines, such as broken center lines, in one preferred exemplary embodiment no warning and no reaction are generated. In another embodiment, in this case, an inconspicuously fashioned warning takes place, such as a soft tones, a smaller optical representation, less conspicuous colors, etc.

If observation of the neighboring lane yields no information about the direction of travel in the neighboring lane, no (less conspicuous) warning and no reaction are generated. If the travel direction of traffic in the neighboring lane is known, no warning is emitted or the warning is designed to be inconspicuous if the driver changes to a traffic lane having traffic in the same direction. If he changes to a lane having traffic in the opposite direction, a warning is emitted. The vehicle intervention (reaction) takes place in one case and not in the other.

In another exemplary embodiment it is ascertained from the data of a navigation system that are present whether the vehicle is on a road on which the respective neighboring lane is being used by vehicles going in the same direction, or which represent traffic in the opposite direction.

In still another embodiment, if there is a solid line, a warning is always given, and in the case of a broken line only if the neighboring lane was recognized as being a lane for oncoming traffic.

Depending on the exemplary embodiment and the outfitting with sensors, it may be provided that, in the case of a broken line a warning is emitted if, via the sensor system, actually present objects in the neighboring lane are detected in the same direction of travel, near the vehicle.

In one exemplary embodiment, a driving situation that has once been recognized is assumed until other information is present. If, for example, it is recognized that the vehicle is on its way in a traffic lane having oncoming traffic, a traffic lane having traffic in the same direction is assumed only if this is reliably recognized. The corresponding thing is true for recognizing a driving situation having oncoming traffic.

If a warning is suppressed, and if it is recognized at the same time that the vehicle will probably leave the lane, then, in one preferred exemplary embodiment, in this situation, a blinker noise is automatically put out for the driver as inconspicuous information. In one preferred exemplary embodiment, in addition in this situation, the respective blinker is switched on in order to inform other traffic participants.

The above described procedure is implemented using programs which are implemented on microcomputer 14. The latter generates the output signals for the warning or vehicle intervention, with the aid of the programs and according to the input signals supplied. In the light of a flow diagram, a preferred exemplary embodiment of the procedure represented above is shown below.

Figure 2:
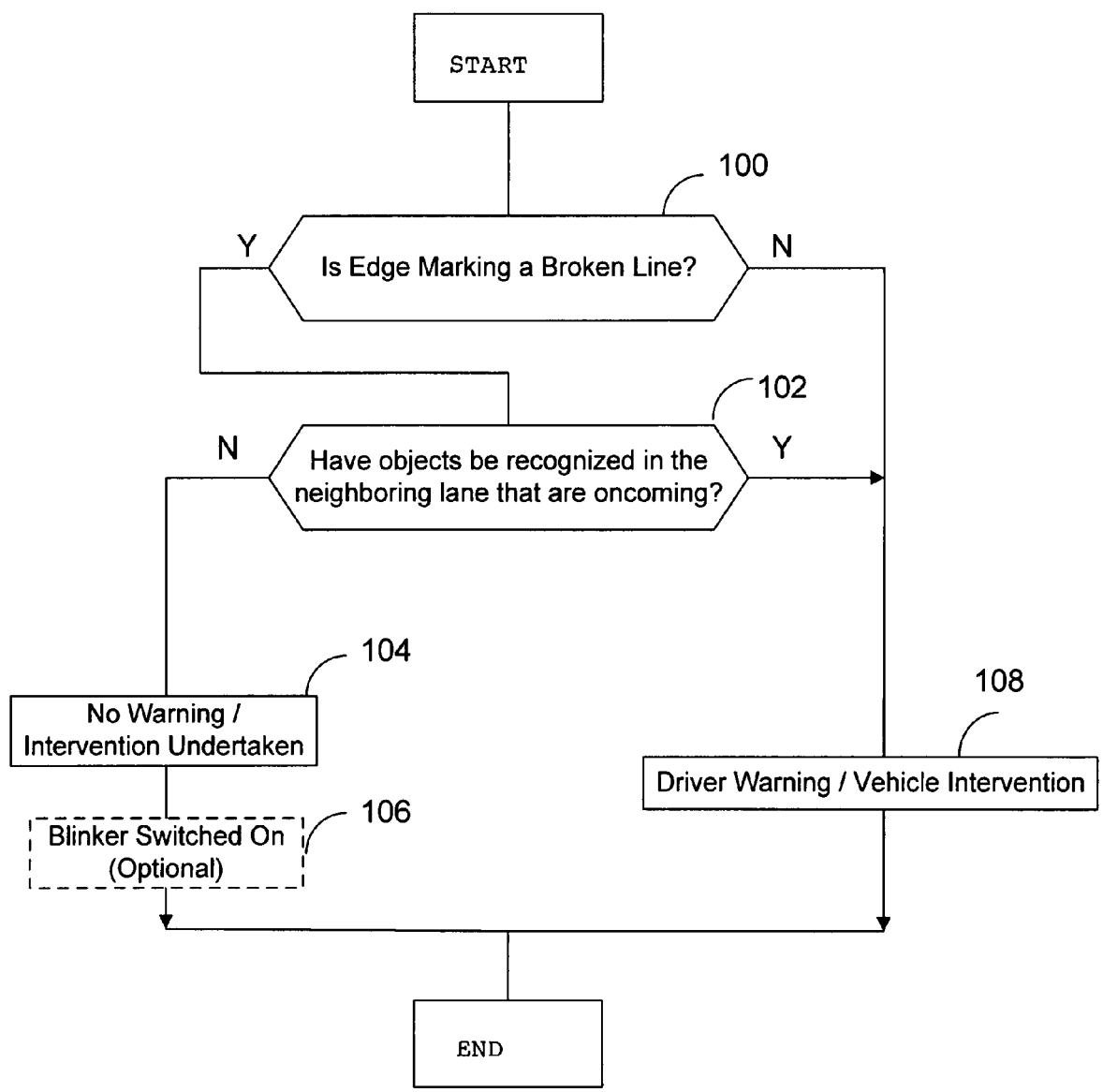
FIG. 2 shows a flow chart is sketched in which a preferred procedure for triggering the driver warning is shown.
Figure 3A:
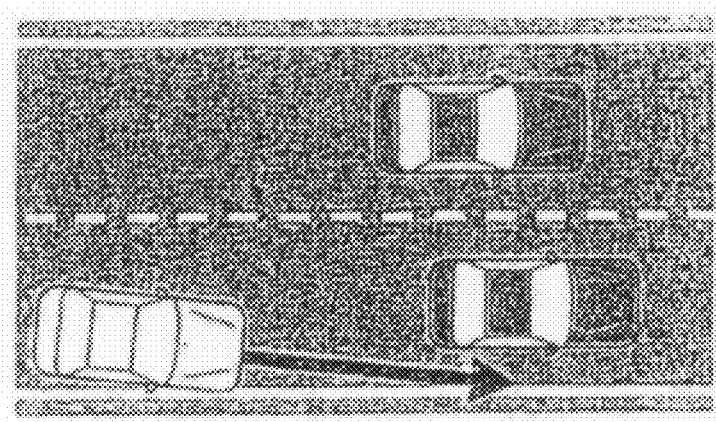
FIG. 3a shows a first illustration of a threat of crossing a solid line.
Figure 3B:
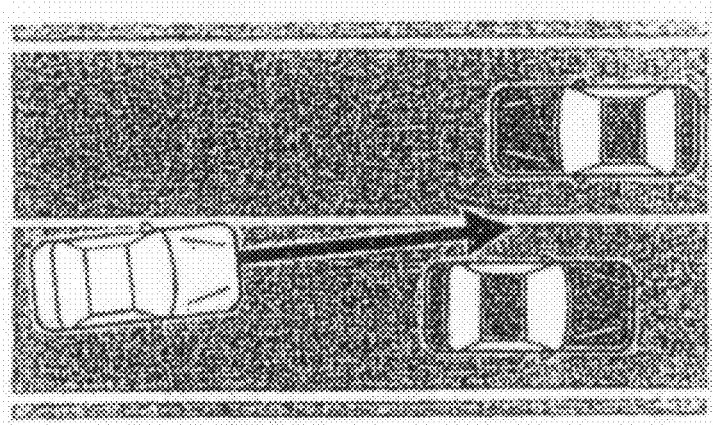
FIG. 3b shows a second illustration of a threat of crossing a solid line.
Figure 3C:
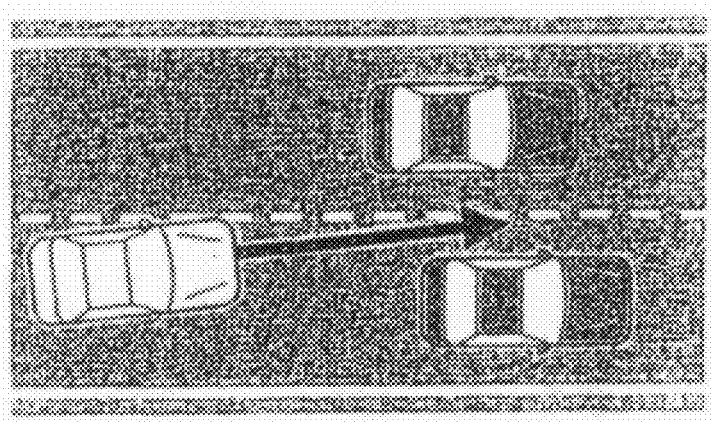
FIG. 3c shows a first illustration of a threat of crossing a broken line.
Figure 3D:
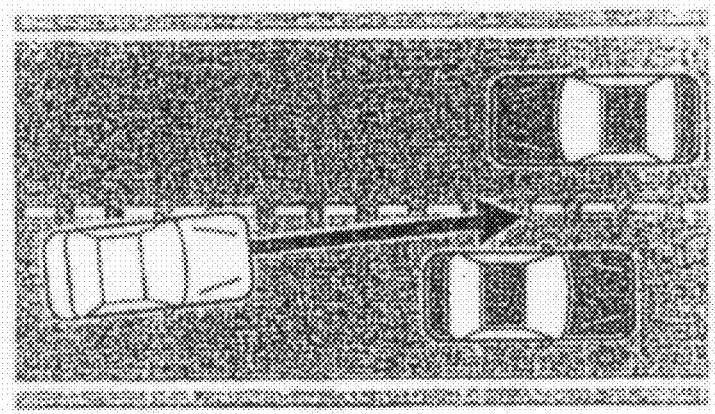
FIG. 3d shows a second illustration of a threat of crossing a broken line.

The program shown in FIG. 2 is run through when it has been recognized that there is a danger that the vehicle will leave its lane. In first step 100 it is determined whether the marking, whose crossing is being threatened, is a solid or a broken line. This is done based on the corresponding information from the image evaluation unit. If the edge marking is a solid line, then, according to step 108, a driver warning/vehicle intervention takes place, for example, by acoustical and/or optical and/or haptic warning, or by intervention in the vehicle steering. However, if, in step 100, it was recognized that the lane marking, the crossing of which is being-threatened, is a broken line, then in step 102 the traffic situation with respect to the neighboring lane, to which one could change, is checked. As was described above, it is checked, using a relative speed signal, whether the traffic moving on the neighboring lane is on its way in the same travel direction or in the opposite direction. In this context, a marker is set if, possibly several times in a row, objects in the respective neighboring lane have been recognized that are oncoming. If the marker has been set, step 108 follows with a driver warning/vehicle intervention. The marker is canceled when it has been certainly recognized (i.e. several times in a row) that objects in the neighboring lane are traveling in the same direction. If the marker has been canceled, in step 104, no warning/vehicle intervention is undertaken; in one embodiment, automatically a blinker noise generated or an optical indication given. Optionally then, in step 106 the corresponding blinker is switched on in order to inform other traffic participants. After step 106 or 108, the program is continued again for the ascertainment of the danger of crossing an edge marking. In other embodiments, in response to a recognized broken line and traffic in the driving direction, a warning is generated if an object has been recognized close to the vehicle, and/or in the case of oncoming traffic, if an oncoming vehicle is actually recognized. In the latter case, an inconspicuous, or no warning is emitted if the neighboring traffic lane is actually for oncoming traffic, but no actual oncoming traffic has been recognized.

In FIG. 3 various driving situations are shown in which, upon leaving the lane or when there is a threat of leaving the lane, a driver warning takes place or does not. In FIGS. 3*a* and 3*b* there is a threat of crossing a solid line, so that, in this case, independently of the driving situation, a warning occurs. In FIGS. 3*c* and 3*d* there is a threat of crossing a broken line. In this case, as shown above, a warning occurs if there is oncoming traffic in the neighboring lane or if oncoming traffic is to be expected. This situation is depicted in FIG. 3*d*, in which, therefore, a driver warning takes place. In FIG. 3*c*, on the other hand, the vehicle in the neighboring lane is traveling in the same direction, so that, in this case, the warning may be omitted or is made less conspicuous (more softly, blinker noise, smaller, etc).

In one additional specific embodiment, the warning is delayed or undertaken using less intensity if the vehicle crosses a line in the direction of a lane which is known, e.g. from the information of a navigation system as a breakdown lane.

What is claimed is:

1. A method for driver information and for a reaction when leaving a traffic lane, comprising:
   performing at least one of providing a warning including driver information and a vehicle intervention as a reaction if a vehicle threatens to leave the traffic lane towards an adjacent lane;
   recording at least one boundary of the traffic lane, wherein the at least one boundary is shared with the adjacent lane;
   determining whether a boundary marking of the at least one boundary of the traffic lane is one of solid or broken;
   identifying a direction of traffic traveling in the adjacent lane sharing the at least one boundary of the traffic lane;
   wherein the at least one of the warning and the reaction is a function of both the boundary marking of the at least one boundary of the traffic lane and the direction of traffic traveling in the adjacent lane; and
   wherein: (a) the at least one of the warning and the reaction is generated if the boundary marking of the at least one boundary of the traffic lane is solid; and (b) the at least one of the warning and the reaction is suppressed if the boundary marking of the at least one boundary of the traffic lane is broken and the direction of traffic traveling in the adjacent lane is in the same direction as the direction of travel of the vehicle.

2. The method as recited in claim 1, wherein the warning and the reaction takes place if a boundary marking of the traffic lane is a solid line traffic lane marking.

3. The method as recited in claim 1, wherein:
   the driver warning and the vehicle intervention one of do not occur and occur less conspicuously, if a boundary marking of the traffic lane is a broken line traffic lane marking.

4. The method as recited in claim 1, wherein:
   the driver warning and the vehicle intervention occur if, in a neighboring lane, into which the vehicle may possibly enter, oncoming traffic is to be expected.

5. The method as recited in claim 1, wherein:
   the driver warning and the vehicle intervention occur one of delayed in time and with less intensity, if the neighboring lane, into which the vehicle may possibly travel, is a breakdown strip.

6. The method as recited in claim 1, wherein a less conspicuous warning occurs in that at least one of a blinker noise and an acoustical warning having at least one of a softer tone and one of a smaller optical display and a less conspicuous optical display takes place.

7. The method as recited in claim 1, wherein in response to a broken line traffic marking, the driver warning and the driver intervention take place only if one of oncoming traffic was actually recognized and a vehicle is moving in the same travel direction near the vehicle.

8. The method as recited in claim 1, wherein in response to a suppressed and inconspicuous driver warning, an activation of a corresponding blinker takes place to inform other traffic participants.

9. A device for driver information and for reaction upon leaving the traffic lane, comprising:
   an evaluation unit that activates at least one of a warning to the driver and a vehicle intervention when a threat of leaving the traffic lane towards an adjacent lane occurs; and
   a microcomputer including a program that records at least one boundary marking of a boundary of the traffic lane, wherein the boundary is shared with the adjacent lane, and wherein the program determines whether the at least one boundary marking is one of solid or broken, and wherein the program determines a direction of traffic traveling in the adjacent lane sharing the boundary of the traffic lane,
   wherein at least one of the driver warning and the vehicle intervention is a function of both the at least one boundary marking of the traffic lane and the direction of traffic traveling in the adjacent lane sharing the boundary of the traffic lane; and
   wherein: (a) the at least one of the warning and the intervention is generated if the at least one boundary marking of the boundary of the traffic lane is solid; and (b) the at least one of the warning and the intervention is suppressed if the at least one boundary marking of the boundary of the traffic lane is broken and the direction of traffic traveling in the adjacent lane is in the same direction as the direction of travel of the vehicle.

* * * * *